Sept. 29, 1970        C. E. KERR        3,530,738
BICYCLE STEERING WHEEL ASSEMBLY
Filed Feb. 25, 1969        3 Sheets-Sheet 1
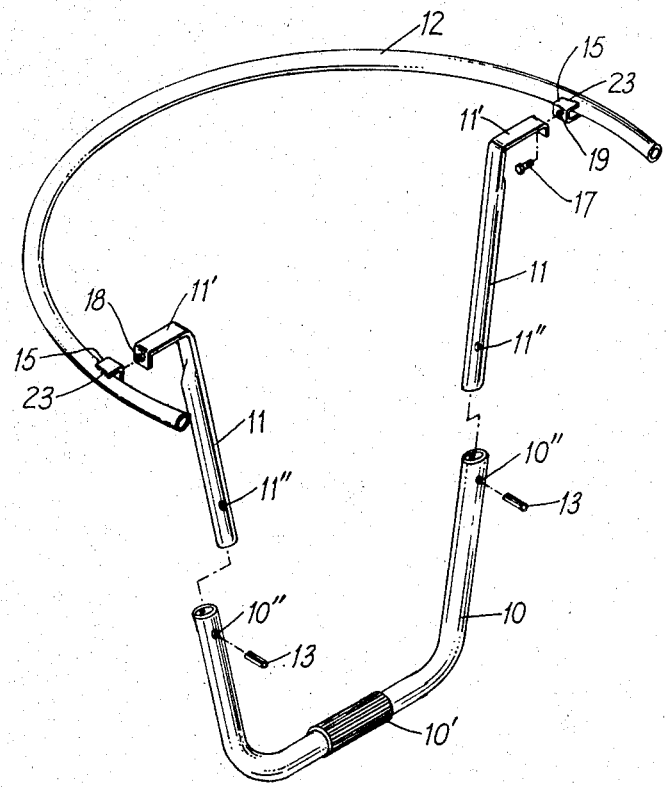
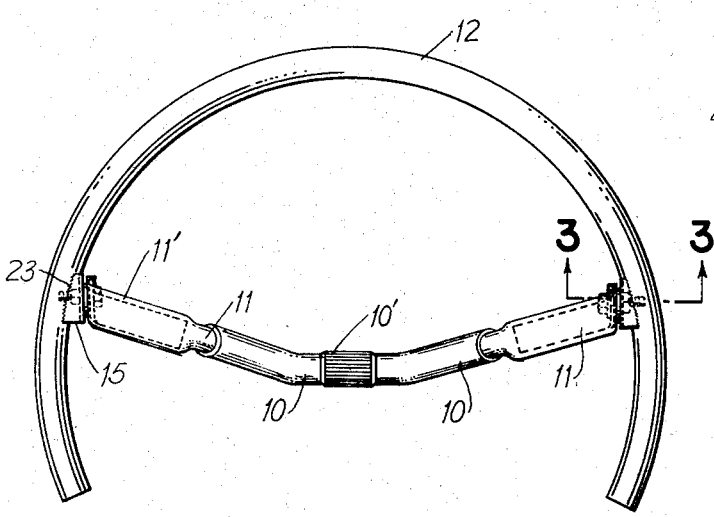
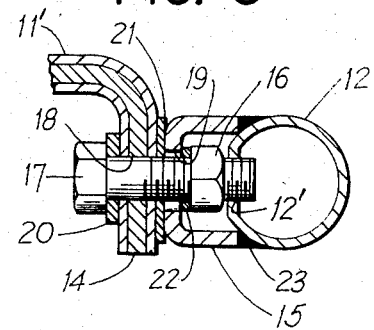
INVENTOR.
CHARLES E. KERR
BY
ATTORNEY Sept. 29, 1970  C. E. KERR  3,530,738
BICYCLE STEERING WHEEL ASSEMBLY
Filed Feb. 25, 1969  3 Sheets-Sheet 2

INVENTOR.
CHARLES E. KERR
BY
ATTORNEY

Sept. 29, 1970  C. E. KERR  3,530,738

BICYCLE STEERING WHEEL ASSEMBLY

Filed Feb. 25, 1969  3 Sheets-Sheet 3

INVENTOR.
CHARLES E. KERR
BY
ATTORNEY

United States Patent Office 3,530,738
Patented Sept. 29, 1970

3,530,738
BICYCLE STEERING WHEEL ASSEMBLY
Charles E. Kerr, Little Rock, Ark., assignor to American Machine & Foundry Company, a corporation of New Jersey
Filed Feb. 25, 1969, Ser. No. 801,947
Int. Cl. B62k 21/16
U.S. Cl. 74—551.3                              7 Claims

ABSTRACT OF THE DISCLOSURE

A U-shaped tubular member is adjustably fixed to a steering wheel fork. Two tubular struts are telescopically mounted at one end in the legs of the U-shaped member. A handle bar is adjustably mounted to the other ends of the struts. The adjustments at the fork mounting and at the ends of the struts permit the handle bar to be releasably secured in a variety of positions.

---

This invention relates to a bicycle steering wheel assembly, and more particularly to one which affords a wide range of adjustments, and style modifications by replacement of certain removable parts thereof.

One form of bicycle steering wheel assembly which has proven to be very popular with juveniles and teenagers is one employing a full circle handle bar. The circular bar is fixed to the upper end of a U-shaped member which in turn is adjustably fixed to the upper end of a steering wheel fork.

This arrangement provides only a single adjustment of the attitude of the steering wheel with respect to the bicycle frame or the bike user, and this is at the connection between the U-shaped member and the steering wheel fork. In addition, no significant modifications can be made in the styling or design of the assembly without replacing either one or both of its major components.

It is an object of this invention to provide a steering wheel assembly which will provide a wide range of adjustment and modifications of its style or design in an expeditious and low cost manner.

Briefly, in one form of the invention the handle bars are adjustably fixed to the U-shaped member so that a second place of adjustment is provided to additionally vary the attitude of the steering wheel. In addition, the steering wheel is connected to the U-shaped member by removable struts. These struts make it possible to significantly vary the styling or design of the assembly by replacing either or both the steering wheel and struts while still retaining the original U-shaped member.

The features of the invention which are believed to be novel are set forth with particularity in the appended claims. The invention itself, however, both as to its organization and operation, together with further objects and advantages thereof, may best be understood by reference to the following description taken in connection with the accompanying drawings in which:

FIG. 1 is an exploded perspective view of one form of the invention;

FIG. 2 is a top plan view thereof;

FIG. 3 is an enlarged sectional view taken along the section line 3—3 of FIG. 2.

Figure 4:
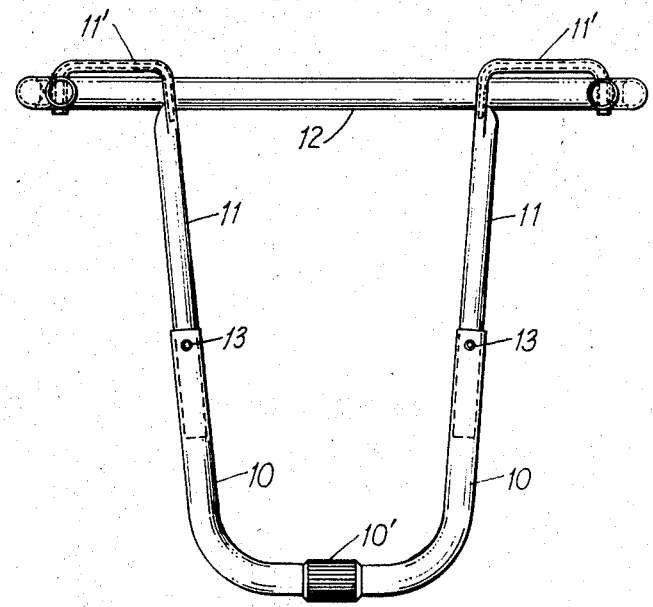
FIG. 4 is a rear elevation view of the steering wheel assembly.

Referring now first to FIGS. 1 to 5 of the drawings, the assembly comprises a main U-shaped member 10, a pair of struts 11, and a semi-circular handle bar 12. The center of member 10, which is tubular, has a knurled part 10' so it can be adjustably fixed to the upper end of a not shown steering wheel fork by a suitable clamp which is well known to those skilled in the art. The struts 11 are also tubular. Their upper ends are flattened and formed into U-shapes 11' as shown best in FIG. 1. The lower ends of struts 11 are telescoped into the upper ends of the legs of the U-shaped member 10. These telescoped portions are removably retained in assembled position by aligned apertures 10" and 11" and a removable retainer 13 which is adapted to enter the aligned apertures.

The upper ends of struts 11 and diametrically opposite sides of handle bar 12 are adjustably fixed together in a manner best shown in FIG. 3. The upper U-shaped ends of struts 11 are reinforced by inserts 14. U-shaped brackets 15 are fixed to the handle bar 12. Nuts 16 and bolts 17 adjustably connect the handle bar 12 and struts 11 together. The nuts 16 are inside the brackets 15. The bolts 17 extend through aligned apertures 18 and 19 into the nuts 16. A washer 20 is positioned beneath the head of the bolts, and one or more lock washers 21, 22 are disposed on the bolts.

Apertures 12' are formed in the tube 12 behind the nuts 16. These apertures can be used as alignment means when connecting the brackets 15 to the tube 12 as by welds 23. They also serve to strengthen the connection and avoid loose or falling parts since the inner ends of the bolts enter these apertures and the nuts are captive in the brackets in the manner illustrated in FIG. 3.

Figure 5:
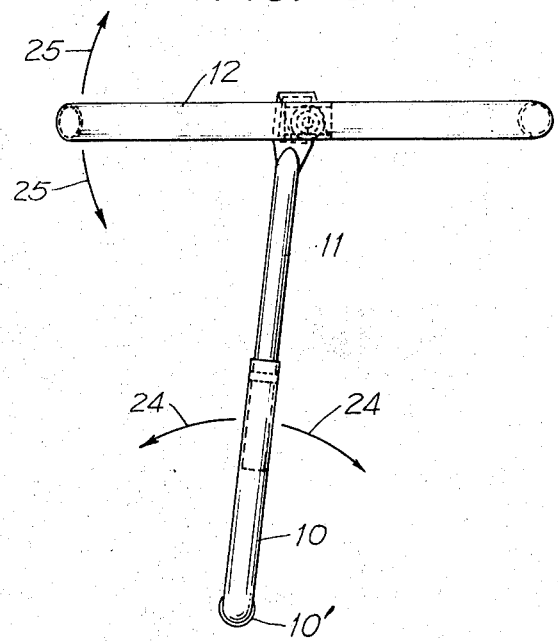
FIG. 5 is a side elevation view thereof.

By viewing FIG. 5 it will be seen that the assembly can be adjusted at two places. One is at the knurled portion 10' to move the assembly toward or away from the bike rider. This change is illustrated by arrows 24. The other change is to tilt the wheel 12 up or down as shown by arrows 25, and this is accomplished at the adjustable connection illustrated in FIG. 3. Thus, the U-member 10 and struts 11 are in an upright plane and the wheel 12 is in another plane. Both planes can be adjusted with respect to the bike frame or rider and also with respect to each other.

Figure 6:
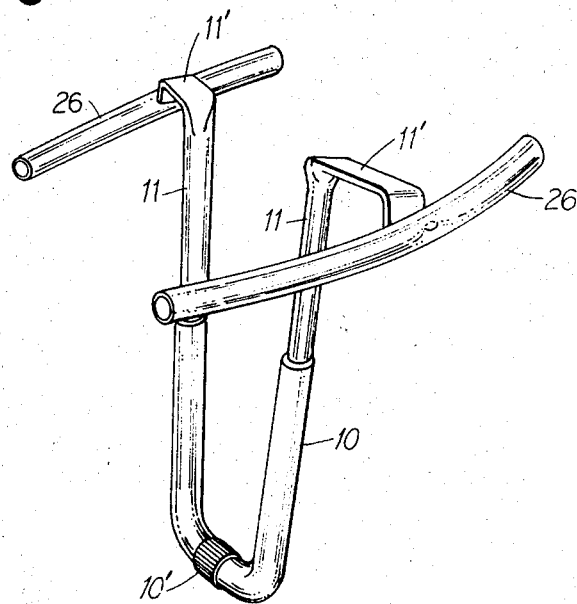
FIG. 6 is a perspective view of a modification.
Figure 7:
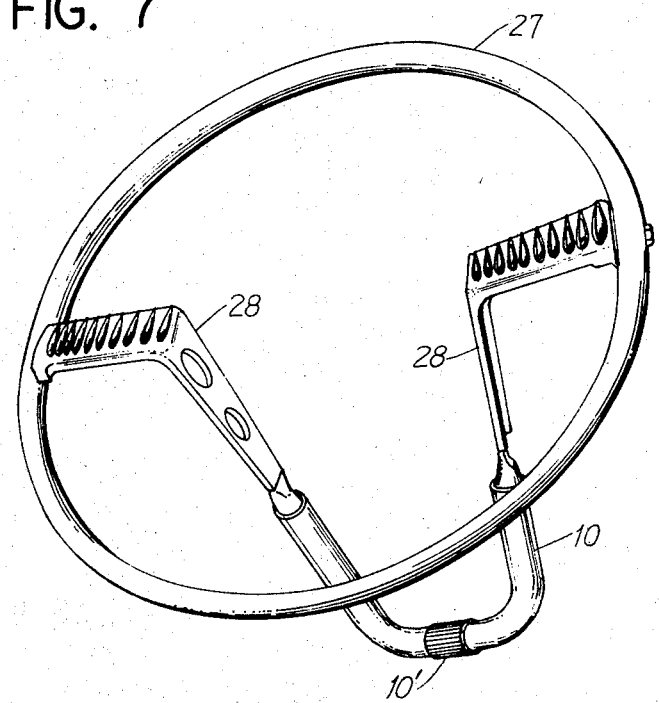
FIG. 7 is a perspective view of another modification.

In the modification of FIG. 6 the same U-member 10, struts 11 and adjustable connection of FIG. 3 is used. However, the handle half wheel 12 is replaced by arcuate segments 26. In the modification of FIG. 7 the original U-member 10 is still used, and an adjustable connection similar to that of FIG. 3 can also be used. However, a different handle bar 27 and struts 28 are used to obtain still another visual appearance or design styling.

Thus, it will now be seen that the invention provides a low cost steering wheel assembly which has a small number of parts and is easy to adjust and also modify to provide a variety of different stylings or designs which will suit the tastes or preferences of many bike users. In addition, it is possible to adjust the setting or altitude of the steering means in several respects so that the final setting will satisfy many individual needs.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed:

1. A bicycle steering assembly comprising an upright position and U-shaped member, the central bite portion of said U-shaped member having means thereon for adapting the same adjustable fixed connection to the upper end of a bicycle frame steering wheel fork, a pair of struts positioned on the leg portions of said U-shaped member in alignment with said leg portions and means removably connecting said struts and leg portions together, and handle bar means connected to said struts, said struts comprising removable extension of said U-shaped member and being disposed with said U-shaped member in an upright plane, said handle bar means being disposed in a second plane which is generally perpendicular to said first mentioned plane, and an adjustable fixed connection between said handle bar means and the upper ends of said struts whereby said steering assembly is adjustable with respect to the bicycle frame to which it is connected by adjustment of said first plane with respect to the bicycle frame and said second plane with respect to said first plane.

2. In a bicycle steering assembly as in claim 1, wherein said means on said central bite portion comprises a knurled formation thereon, said handle bar means and the lower ends of said struts being tubular in shape, the lower ends of said struts and the upper ends of said U-shaped member being telescoped with respect to each other, and the means removably connecting said struts and U-shaped member together comprising aligned apertures in their telescoped portions and removable means inserted in said aligned apertures.

3. In a bicycle steering assembly as in claim 1, wherein said handle bar means comprises a generally semi-circular shaped member, the upper ends of said struts being adjustably fixed to diametrically opposite portions of said semi-circular member.

4. In a bicycle steering assembly as in claim 1, wherein said handle bar means comprises a generally circular shaped member, the upper ends of said struts being adjustably fixed to diametrically opposite portions of said circular member.

5. In a bicycle steering assembly as in claim 1, wherein said handle bar means comprises a pair of curved segments which extend front to back of said first mentioned plane, and the upper ends of said struts being adjustably fixed to an intermediate portion of said curved segments.

6. In a bicycle steering assembly as in claim 1, wherein the adjustable fixed connection between said handle bar means and the upper ends of said struts comprises a pair of U-shaped brackets connected to opposite sides of said handle bar means, the upper ends of said struts having integral flattened U-shaped formations thereon, the free ends of said U-shaped formations and the bite portions of said U-shaped brackets having aligned apertures formed therein, and fastening means extending through said aligned apertures comprising a threaded nut in said brackets, a threaded bolt extending through said aligned apertures into said nut, and a lock washer on said bolt.

7. In a bicycle steering assembly as in claim 6, said handle bar means being tubular, apertures formed in said handle bar means behind said nuts, an the inner ends of said bolts extending through said nuts into said last mentioned apertures.

References Cited
UNITED STATES PATENTS 2,777,711  1/1957  Yokomaki _____ 74—551.3 XR
3,336,817  8/1967  Madden _____ 74—552

FRED C. MATTERN, JR., Primary Examiner

F. D. SHOEMAKER, Assistant Examiner

U.S. Cl. X.R.

74—552